United States Patent
Li et al.

(10) Patent No.: US 11,245,825 B2
(45) Date of Patent: Feb. 8, 2022

(54) DUAL-CAMERA MODULE, ELECTRONIC DEVICE, AND IMAGE ACQUISITION METHOD

(71) Applicants: Beijing BOE Optoelectronics Technology Co., Ltd., Beijing (CN); BOE Technology Group Co., Ltd., Beijing (CN)

(72) Inventors: Wei Li, Beijing (CN); Yi Yang, Beijing (CN); Hongyang Yu, Beijing (CN); Jiaxing Chen, Beijing (CN); Shuai Gao, Beijing (CN); Meng Shi, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 23 days.

(21) Appl. No.: 16/623,676

(22) PCT Filed: May 17, 2019

(86) PCT No.: PCT/CN2019/087425
§ 371 (c)(1),
(2) Date: Dec. 17, 2019

(87) PCT Pub. No.: WO2019/223617
PCT Pub. Date: Nov. 28, 2019

(65) Prior Publication Data
US 2020/0195818 A1    Jun. 18, 2020

(30) Foreign Application Priority Data

May 22, 2018  (CN) .......................... 201810495585.7

(51) Int. Cl.
| | | |
|---|---|---|
| H04N 5/225 | (2006.01) | |
| H04N 5/232 | (2006.01) | |
| H04N 5/235 | (2006.01) | |
| G02F 1/133 | (2006.01) | |

(Continued)

(52) U.S. Cl.
CPC ....... *H04N 5/2254* (2013.01); *H04N 5/23229* (2013.01); *G02F 1/1357* (2021.01); *G02F 1/133528* (2013.01); *H04M 1/0264* (2013.01)

(58) Field of Classification Search
None
See application file for complete search history.

(56) References Cited

U.S. PATENT DOCUMENTS 8,508,646 B2    8/2013  Katerberg
9,057,896 B1 *  6/2015  Baldwin ................ H04N 5/235

(Continued)

FOREIGN PATENT DOCUMENTS

CN  201004145 Y   1/2008
CN  102265596 A   11/2011

(Continued)

OTHER PUBLICATIONS

Sep. 12, 2019—(CN) First Office Action Appn 201810495585.7 with English Translation.

*Primary Examiner* — Mark T Monk
(74) *Attorney, Agent, or Firm* — Banner & Witcoff, Ltd.

(57) ABSTRACT

A dual camera assembly, an electronic apparatus and a method of acquiring an image are provided. The dual camera assembly includes: a first camera lens and a second camera lens; a first sensor configured for receiving light that has passed through the first camera lens; a liquid crystal light valve and a polarizer which are on a side, which is close to the first camera lens, of the first sensor. The polarizer is on (Continued)

a side, which is close to the first sensor, of the liquid crystal light valve, and liquid crystal molecules in the liquid crystal light valve are rotatable.

6 Claims, 5 Drawing Sheets

(51) Int. Cl.
  *G02F 1/135* (2006.01)
  *H04M 1/02* (2006.01)
  *G02F 1/1335* (2006.01)

(56) References Cited

U.S. PATENT DOCUMENTS

| | | | |
|---|---|---|---|
| 10,244,154 B2 | 3/2019 | Li et al. | |
| 2004/0012753 A1* | 1/2004 | Udaka | G02B 5/005 |
| | | | 349/187 |
| 2016/0037077 A1* | 2/2016 | Hansen | H04N 5/2254 |
| | | | 348/164 |
| 2016/0252768 A1* | 9/2016 | Zhong | G02F 1/136286 |
| | | | 349/43 |
| 2017/0110051 A1* | 4/2017 | Gardner, Jr. | H05B 47/10 |
| 2019/0107730 A1 | 4/2019 | Liu et al. | |

FOREIGN PATENT DOCUMENTS

| | | |
|---|---|---|
| CN | 103795899 A | 5/2014 |
| CN | 105467714 A | 4/2016 |
| CN | 105530419 A | 4/2016 |
| CN | 106534642 A | 3/2017 |
| CN | 106954006 A | 7/2017 |
| CN | 107592465 A | 1/2018 |
| CN | 108566504 A | 9/2018 |
| JP | H08275067 A | 10/1996 |
| JP | 2016072924 A | 5/2016 |

\* cited by examiner (a) (b)

DUAL-CAMERA MODULE, ELECTRONIC DEVICE, AND IMAGE ACQUISITION METHOD

The application is a U.S. National Phase Entry of International Application No. PCT/CN2019/087425 filed on May 17, 2019, designating the United States of America and claiming priority to Chinese Patent Application No. 201810495585.7, filed on May 22, 2018. The present application claims priority to and the benefit of the above-identified applications and the above-identified applications are incorporated by reference herein in their entirety.

TECHNICAL FIELD

At least one embodiment of the present disclosure relates to a dual camera assembly, an electronic apparatus and a method of acquiring an image.

BACKGROUND

With rapid development and wide popularity of electronic apparatuses, functions of electronic apparatuses are more and more diversified. Users use the electronic apparatuses to study, entertain, and take photos and so on. With the users' higher and higher requirements on taking photos, the electronic apparatuses with two cameras emerge and are developed, such as a smart phone with two cameras.

Solutions such as a dual camera assembly with two camera lenses in which two groups of symmetrical photosensitive elements are provided at the beginning of the development of the dual camera assembly with two camera lenses, the dual camera assembly with two camera lenses in which a main camera lens and a sub-camera lens are specifically divided, and even now the dual camera assembly with two camera lenses in which both color display and black-and-white display are achieved, or both wide angle and long focus are achieved, and so on can realize special functions such as blurring depth of field, lossless optical zoom, dark light enhancement and the like.

However, during a photographing process of taking the photo, if natural light is reflected at an interface (such as a water surface, an asphalt road surface, a wall surface), an actual scene cannot be photographed. As illustrated in FIG. 1, the actual scene seen by human eyes is illustrated in portion (b) of FIG. 1, but a photographed image is illustrated in portion (a) of FIG. 1 which is influenced by light reflection. At present, no dual camera assembly for eliminating strong reflection on a surface of an object is provided.

SUMMARY

According to at least one embodiment of the present disclosure, a dual camera assembly is provided. The dual camera assembly comprises: a first camera lens and a second camera lens; a first sensor configured for receiving light that has passed through the first camera lens; and a liquid crystal light valve and a polarizer which are on a side, which is close to the first camera lens, of the first sensor. The polarizer is on a side, which is close to the first sensor, of the liquid crystal light valve, and liquid crystal molecules in the liquid crystal light valve are rotatable.

For example, the liquid crystal light valve and the polarizer are between the first camera lens and the first sensor.

For example, the liquid crystal light valve and the polarizer are on a side, which is away from the first sensor, of the first camera lens.

For example, the liquid crystal light valve is on a side, which is away from the first sensor, of the first camera lens, and the polarizer is between the first camera lens and the first sensor.

For example, the dual camera assembly further comprises an infrared filter on the side, which is close to the first camera lens, of the first sensor.

For example, the polarizer is between the liquid crystal light valve and the infrared filter.

For example, the dual camera assembly further comprises a circuit board connected with the liquid crystal light valve, wherein the circuit board is configured to drive the liquid crystal molecules in the liquid crystal light valve to rotate.

For example, the first senor is connected with the circuit board.

For example, the dual camera assembly further comprises a second sensor configured for receiving light that has passed through the second camera lens, wherein the light that has passed through the second camera lens does not pass through the liquid crystal light valve and the polarizer.

For example, the liquid crystal light valve comprises a first electrode layer, a second electrode layer and a liquid crystal layer which is sandwiched between the first electrode layer and the second electrode layer and comprises the liquid crystal molecules.

For example, each of the first electrode layer and the second electrode layer is a planar electrode.

According to at least one embodiment of the present disclosure, an electronic apparatus is provided. The electronic apparatus comprises the dual camera assembly as described above.

For example, the electronic apparatus further comprises a main control circuit. The dual camera assembly comprises a circuit board connected with the liquid crystal light valve and the circuit board comprises a connector, and the circuit board is connected with the main control circuit by the connector.

According to at least one embodiment of the present disclosure, a method of acquiring an image adopting the dual camera assembly as described above is provided. The method comprises: allowing the first camera lens to continuously acquire a plurality of first images, and allowing the second camera lens to acquire a second image during a period in which the first camera lens continuously acquires the plurality of first images, wherein the liquid crystal molecules in the liquid crystal light valve rotate by a set angle after the first camera lens acquires one of the plurality of first images; acquiring a target reflected light region according to the plurality of the first images and/or the second image; selecting one of the plurality of first images, which has a minimum brightness in the target reflected light region, as a minimum brightness image; comparing the minimum brightness image with the second image to obtain a brightness ratio at a same pixel in a region other than the target reflected light region; and increasing brightness of each pixel of the minimum brightness image according to the brightness ratio to generate the image in which light reflection is eliminated.

For example, the acquiring the target reflected light region according to the plurality of the first images comprises: comparing brightness of the plurality of first images, taking a region composed of pixels, at each of which a brightness difference is larger than a set value, as a first estimated reflected light region, and taking the first estimated reflected light region as the target reflected light region.

For example, the acquiring the target reflected light region according to the second image comprises: acquiring an average brightness of all pixels in the second image, taking a region composed of pixels, each of which has brightness larger than the average brightness, as a second estimated reflected light region, and taking the second estimated reflected light region as the target reflected light region.

For example, the acquiring the target reflected light region according to the plurality of the first images and the second image comprises: comparing brightness of the plurality of first images, and taking a region composed of pixels, at each of which a brightness difference is larger than a set value, as a first estimated reflected light region; acquiring an average brightness of all pixels in the second image, and taking a region composed of pixels, each of which has brightness larger than the average brightness, as a second estimated reflected light region; and taking a region composed of pixels, each of which is in both the first estimated reflected light region and the second estimated reflected light region, as the target reflected light region.

For example, the first camera lens continuously acquires N first images, and the liquid crystal molecules in the liquid crystal light valve rotate by $(180/N)°$ after the first camera lens acquires one of the first images.

For example, the first camera lens continuously acquires four first images, and the liquid crystal molecules in the liquid crystal light valve rotate by 45° after the first camera lens acquires one of the first images.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

During a photographing process, reflected light has a great influence on the photographing effect. Most strong reflection on a surface of an object comes from specular reflection occurring on a relatively smooth surface such as a water surface, a glass curtain wall and so on. The reflected light has the following two characteristics: firstly, it has a strong polarization state, it is even a linearly polarized light at a certain angle; secondly, it has strong brightness. During a SLR (Single Lens Reflex) camera is used to take a photo, a polarization lens is used to eliminate the reflected light reflected by the surface of the object. The polarization lens eliminates the reflected light reflected by the surface of the object mainly as follows: when natural light is reflected on the interface, the reflected light is a partially polarized light and is a linearly polarized light in the Brewster angle direction; by setting the polarization direction of the polarization lens perpendicular to the polarization direction of the reflected light, the reflected light is filtered out, thereby eliminating the influence of the reflected light on a field of view.

In a using process of the SLR camera, the lens needs to be manually rotated to obtain an appropriate polarization direction, and the user needs to judge whether the rotation of the polarization lens is appropriate. Furthermore, the polarization lens weakens the light entering a sensor, making it difficult to capture details of weak light. Due to the above reasons, it is difficult to apply the polarization lens in a mobile phone.

Figure 1:
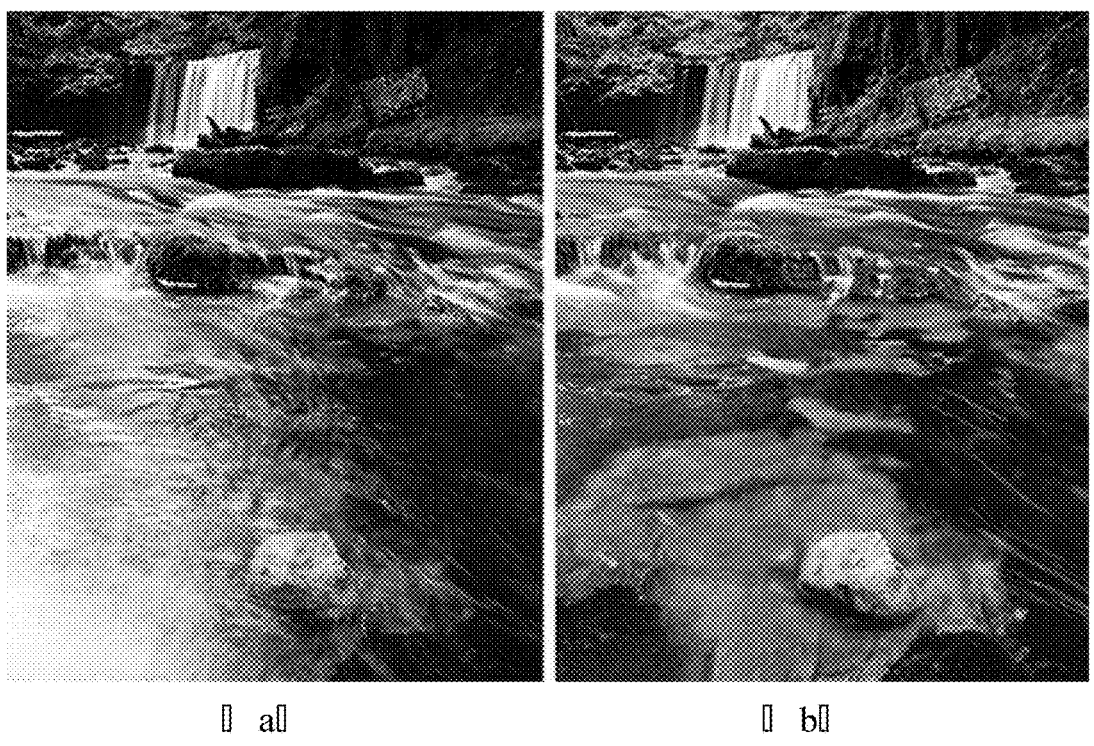
FIG. 1 is a comparative diagram before and after a reflected light is filtered out according to one technique.
Figure 2:
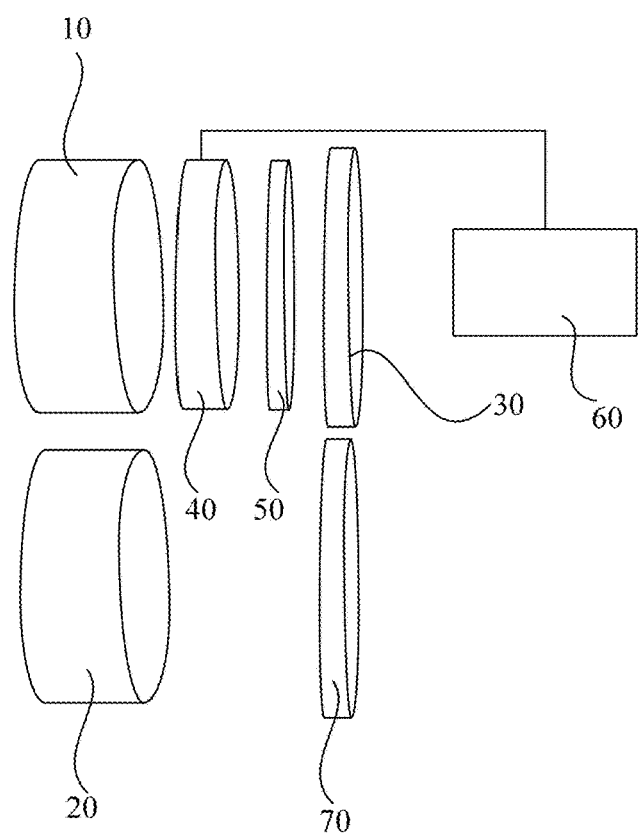
FIG. 2 is a schematic diagram of a dual camera assembly provided by embodiments of the present disclosure.

At least one embodiment of the present disclosure provides a dual camera assembly, as illustrated in FIG. 2, the dual camera assembly comprises a first camera lens 10, a second camera lens 20, and a first sensor 30 configured for receiving light that has passed through the first camera lens 10; the dual camera assembly further comprises a liquid crystal light valve 40 and a polarizer 50 that are on a side, which is close to the first camera lens 10, of the first sensor 30, and a circuit board 60 that is connected with the liquid crystal light valve 40; the polarizer 50 is on a side, which is close to the first sensor 10, of the liquid crystal light valve 40; the circuit board 60 is configured for driving liquid crystal molecules in the liquid crystal light valve 40 to rotate.

For example, the first sensor 30 is a device configured for receiving the light that has passed through the first camera lens 10 and converting the light into electrical signals. For example, the first sensor 30 is a CCD (Charge Coupled Device) or a CMOS (Complementary Metal Oxide Semiconductor) device.

For example, as illustrated in FIG. 2, the dual camera assembly further comprises a second sensor 70 configured for receiving light that has passed through the second camera lens 20. For example, the second sensor 70 is a CCD or a CMOS. For example, the first sensor 30 and the second sensor 70 are of a same type; however, the embodiments of the present disclosure are not limited to this, and the first sensor 30 and the second sensor 70 may be of different types. For example, the light that has passed through the second camera lens 20 does not pass through the liquid crystal light valve 40 and polarizer 50 that are mentioned above.

For example, the liquid crystal light valve 40 and the polarizer 50 are on the side, which is close to the first camera lens 10, of the first sensor 30, thus the liquid crystal light valve 40 and the polarizer 50 are on a side, which is away from the first sensor 30, of the first camera lens 10, or, the liquid crystal light valve 40 is on the side, which is away from the first sensor 30, of the first camera lens 10 and the polarizer 50 is between the first camera lens 10 and the first sensor 30, or, as illustrated in FIG. 2, both the liquid crystal light valve 40 and the polarizer 50 are between the first camera lens 10 and the first sensor 30, as long as it satisfies that the polarizer 50 is on the side, which is close to the first sensor 30, of the liquid crystal light valve 40.

Figure 6:
FIG. 6 is a schematic diagram of a liquid crystal light valve of the dual camera assembly provided by the embodiments of the present disclosure.
Figure 6:

For example, the liquid crystal light valve 40 controls the rotation of the liquid crystal molecules by being applied with voltages so as to control a polarization direction of light passing through it. For example, as illustrated in FIG. 6, the liquid crystal light valve 40 includes a liquid crystal layer 403 and further includes a first electrode layer 401 and a second electrode layer 402 that are configured for providing an electric field to the liquid crystal molecules in the liquid crystal layer 403. For example, because dot control of the liquid crystal molecules is not required, each of the first electrode layer 401 and the second electrode layer 402 is a planar electrode. The "planar electrode" means that the first electrode layer 401 is continuous without a plurality of portions spaced from each other, and the second electrode layer 402 is continuous without a plurality of portions spaced from each other.

For example, the light filtering principle of the dual camera assembly provided by embodiments of the present disclosure is as follows. In addition to birefringence, there is further a phenomenon called optical rotation effect during light travels in an anisotropic medium. The optical rotation effect means that: during light passes through a transparent medium with an optical rotation characteristic, a part of angular momentum of the transparent medium with the optical rotation characteristic is obtained by the light so that a rotational kinetic energy of the light is increased. Specifically, in the embodiments of the present disclosure, if the light is incident along an optical axis direction of the liquid crystal molecules in the liquid crystal light valve 40, rotation of the polarization direction of the light occurs. The embodiments of the disclosure utilize the optical rotation effect of the liquid crystal molecules to control the rotation of the polarization direction of the light by applying different voltages to the liquid crystal molecules. In operation, during the light passes through the liquid crystal light valve 40, the polarization direction of the light is rotated by the optical rotation effect of the liquid crystal molecules; and then the light passes through the polarizer 50 to image on the first sensor 30. Different images are obtained by adjusting the voltage applied to the liquid crystal light valve 40 to rotate the polarization direction of the reflected polarized light. In this way, if the polarization direction of the reflected polarized light intersects with the polarization direction of the polarizer 50, brightness of the reflected polarized light changes along with changing of the intersection angle between the polarization direction of the reflected polarized light and the polarization direction of the polarizer 50; and if the polarization direction of the reflected polarized light is perpendicular to the polarization direction of the polarizer 50, the reflected polarized light is eliminated.

In the dual camera assembly provided by at least one embodiment of the present disclosure, by adding the liquid crystal light valve 40 and the polarizer 50 and appropriately controlling the rotation angle of the liquid crystal molecules of the liquid crystal light valve 40, the polarizer 50 filters out the reflected polarized light, so that there is no reflected light in the polarized light incident to the first sensor 30, thereby effectively eliminating the influence caused by the reflected light generated on the surface of the object on the photographing effect.

In addition, the embodiments of the present disclosure utilize the optical rotation effect of the liquid crystal molecules to automatically control the angle between the polarization direction of the reflected light and the polarization direction of the polarizer 50 by changing the electric field applied to the liquid crystal molecules, thus eliminating troubles of complicated mechanical structures and manual identification.

In addition, the polarizer 50 and the liquid crystal light valve 40 are provided in the dual camera assembly provided by the embodiments of the present disclosure without changing other structures of the dual camera assembly, and thus other functions (such as black-white dual photography, zoom dual photography) of the dual camera are not affected.

Figure 3:
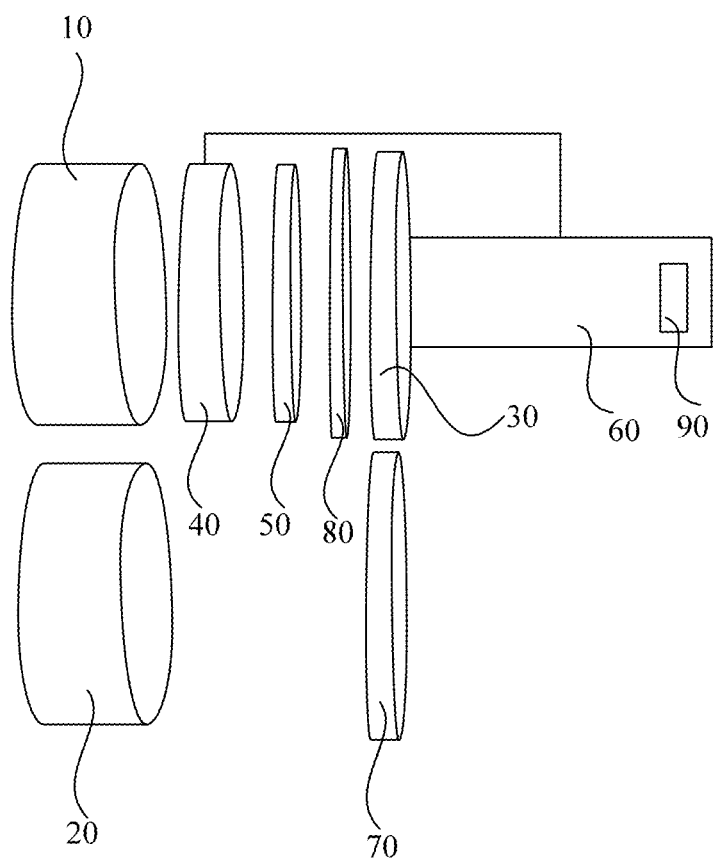
FIG. 3 is another schematic diagram of the dual camera assembly provided by the embodiments of the present disclosure.

In some embodiments, as illustrated in FIG. 3, the dual camera assembly further comprises an infrared filter 80 arranged on the side, which is close to the first camera lens 10, of the first sensor 30. It is only required that the infrared filter 80 is arranged on the side, which is close to the first camera lens 10, of the first sensor 30; for example, the infrared filter 80 is between the first sensor 30 and the polarizer 50, or the infrared filter 80 is between the liquid crystal light valve 40 and the polarizer 50, or the infrared filter 80 is between the first camera lens 10 and the liquid crystal light valve 40, or the infrared filter 80 is on a side, which is far from the first sensor 30, of the first camera lens 10, and no limitation is imposed to this in the embodiments of the present disclosure. For example, the polarizer 50 is between the liquid crystal light valve 40 and the infrared filter 80.

Here, by adding the infrared filter 80, a problem of color shift in daytime is corrected, and brightness at night is increased when using the dual camera assembly at night, so as to reduce snowflake noises and make the image clearer and softer.

In some embodiments, in order to improve the integration of the dual camera assembly, as illustrated in FIG. 3, the first sensor 30 is connected with the circuit board 60, and the circuit board 60 further includes a connector 90 to be connected with an electronic apparatus.

That is, a control circuit of the liquid crystal light valve 40 and a control circuit of the first sensor 30 are integrated on the same circuit board 60. Of course, the second sensor 70 for example is also connected with the circuit board 60, and the circuit board 60 is connected with the electronic apparatus by the connector 90. For example, the circuit board 60 is connected with a central processor, such as a main control circuit, of the electronic apparatus by the connector 90.

For example, the circuit board 60 is a flexible printed circuit (FPC).

Figure 7:
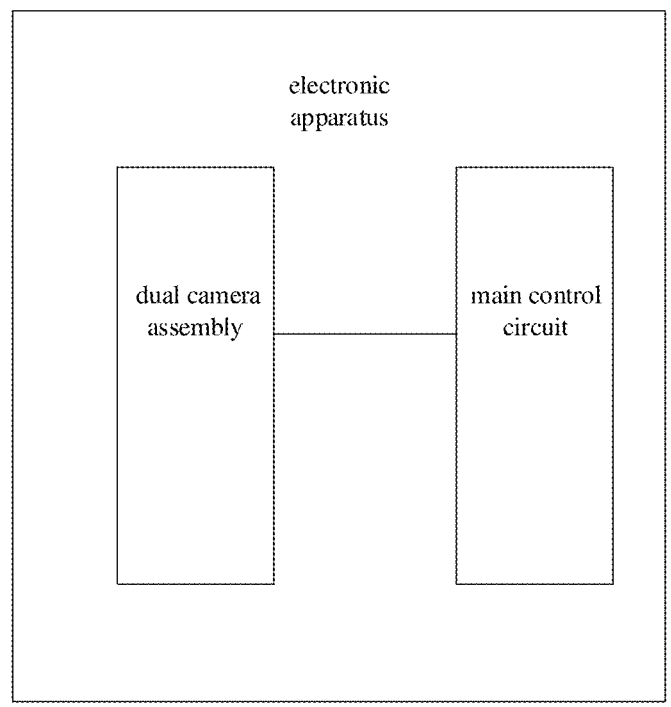
FIG. 7 is a schematic diagram of an electronic apparatus provided by the embodiments of the present disclosure.

The embodiments of the disclosure further provide an electronic apparatus comprising the above-described dual camera assembly. As illustrated in FIG. 7, the electronic apparatus includes the dual camera assembly and a main control circuit connected with the dual camera assembly. For example, the main control circuit is an example of the central processor of the electronic apparatus. For example, as described above, the circuit board 60 of the dual camera assembly is connected with the main control circuit of the electronic apparatus by the connector 90 provided on the circuit board 60.

For example, the electronic apparatus is a mobile phone, a tablet, etc.

The electronic apparatus provided by the embodiments of the present disclosure includes the above-mentioned dual camera assembly, beneficial effects of the electronic apparatus are the same as those of the dual camera assembly, and thus are not repeated here.

Figure 4:
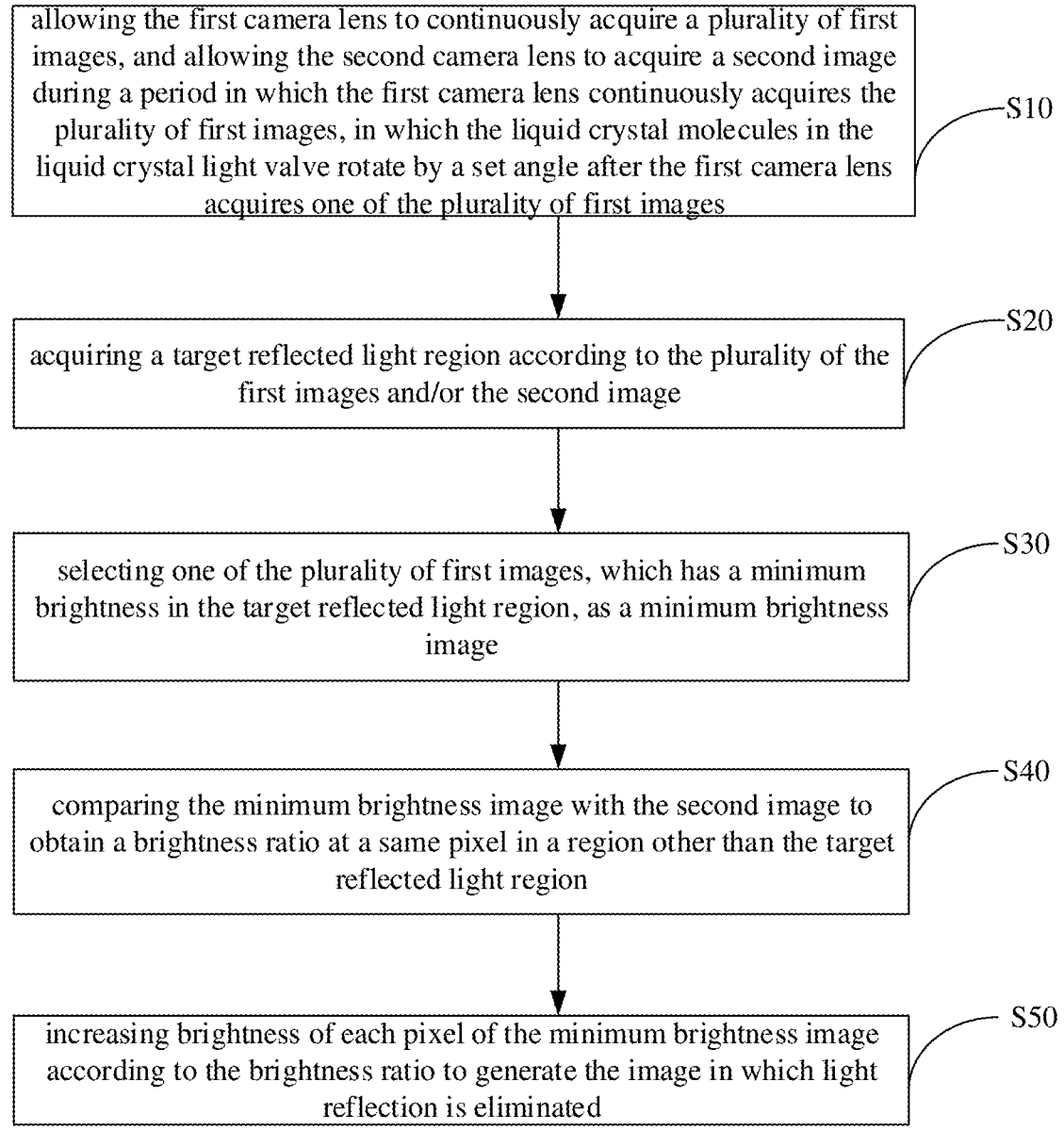
FIG. 4 is a flow chart of a method of acquiring an image provided by the embodiments of the present disclosure.

At least one embodiment of the present disclosure further provides a method of acquiring an image; as illustrated in FIG. 4, the method includes the following steps.

S10: allowing the first camera lens 10 to continuously acquire a plurality of first images, and allowing the second camera lens 20 to acquire a second image during a period in which the first camera lens 10 continuously acquires the plurality of first images, in which the liquid crystal molecules in the liquid crystal light valve 40 rotate by a set angle after the first camera lens 10 acquires one of the plurality of first images. For example, the circuit board 60 controls the liquid crystal molecules in the liquid crystal light valve 40 to rotate by the set angle.

For example, a speed at which the first camera lens 10 continuously acquires the plurality of first images is very fast. The first camera lens 10 acquires one of the first images, and then the circuit board 60 controls the liquid crystal molecules of the liquid crystal layer of the liquid crystal light valve 40 to rotate by the set angle. Along with the rotation of the liquid crystal molecules in the liquid crystal layer, the filtering out effect on the reflected polarized light changes correspondingly. In this way, a brightness difference is small for a region without the reflected light in the plurality of first images, while a brightness difference is large for a region with the reflected light in the plurality of first images.

During the period in which the first camera lens 10 acquires the plurality of first images, the second camera lens 20 acquires the second image, so that the plurality of first images and the second image are images taken for a same real-time scene. Because the liquid crystal light valve 40 and the polarizer 50 are not provided between the second camera lens 20 and the second sensor 70, the brightness of the second image is larger than the brightness of the first images.

In some embodiments, the first camera lens 10 continuously acquires N first images, and the circuit board 60 controls the liquid crystal molecules in the liquid crystal layer to rotate by $(180/N)°$ after the first camera lens 10 acquires one of the first images.

The more the first images are acquired, the better the effect of eliminating light reflection in a finally obtained image is. However, an amount of the acquired first images should be reasonably selected in consideration of a driving capability of the electronic apparatus.

Figure 5:
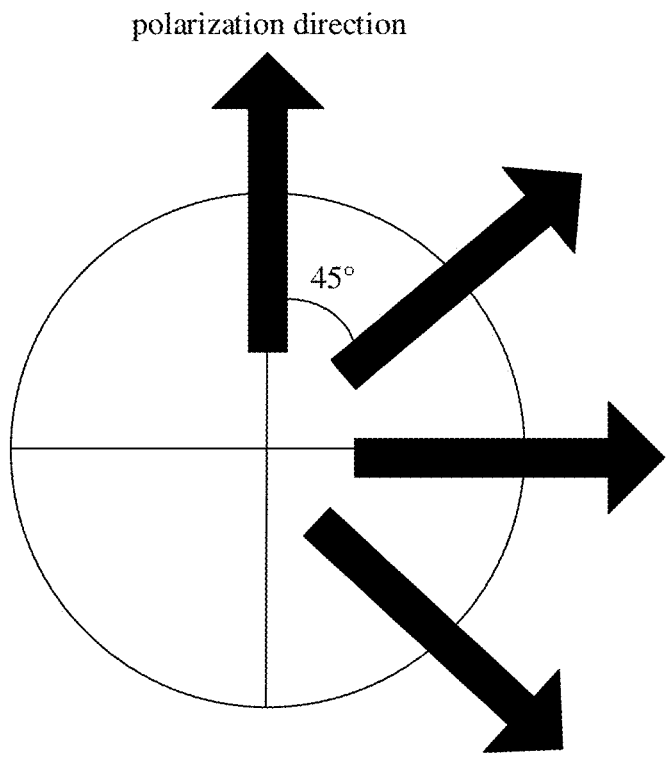
FIG. 5 is a diagram of a variation of a polarization direction provided by the embodiments of the present disclosure.

In some embodiments, as illustrated in FIG. 5, the first camera lens 10 continuously acquires four first images, and the circuit board 60 controls the liquid crystal molecules in in the liquid crystal layer to rotate by 45° after the first camera lens 10 acquires one of the first images.

S20: acquiring a target reflected light region according to the plurality of the first images and/or the second image.

For example, the target reflected light region (a region having the reflected light) is determined by analyzing the plurality of first images, or the target reflected light region (the region having the reflected light) is determined by analyzing the second image, or the target reflected light region (the region having the reflected light) is determined by analyzing the plurality of first images and the second image.

In some embodiments, the acquiring the target reflected light region according to the plurality of the first images comprises: comparing brightness of the plurality of first images, taking a region composed of pixels, at each of which a brightness difference is larger than a set value, as a first estimated reflected light region, and taking the first estimated reflected light region as the target reflected light region.

For example, the set value is selected in combination with the set angle of the rotation of the liquid crystal molecules.

For example, brightness of a 10th pixel of a first one of the first images is compared with brightness of a 10th pixel of a second one of the first images, and the brightness difference therebetween is smaller than the set value; brightness of a 11th pixel of the first one of the first images is compared with brightness of a 11th pixel of the second one of the first images, and the brightness difference therebetween is larger than the set value; brightness of all pixels of the first one of the first images and brightness of all pixels of the second one of the first images are compared in a one-to-one manner, and the region composed of the pixels, at each of which the brightness difference is larger than the set value, is taken as the first estimated reflected light region. For example, the first estimated reflected light region is a continuous region, or include a plurality of sub estimated reflected light regions spaced from each other.

In some embodiments, the acquiring the target reflected light region according to the second image comprises: acquiring an average brightness of all pixels in the second image, taking a region composed of pixels, each of which has brightness larger than the average brightness, as a second estimated reflected light region, and taking the second estimated reflected light region as the target reflected light region.

For example, the brightness of each pixel in the target reflected light region is much higher than the average brightness or close to saturation (if saturation is arrived, the sensor cannot detect corresponding signal), and brightness of adjacent pixels in the target reflected light region varies slightly, so that the target reflected light region is a continuous region.

In order to further improve an accuracy of the determination of the target reflected light region, in some embodiments, a region composed of pixels, each of which is in both the first estimated reflected light region and the second estimated reflected light region, is taken as the target reflected light region.

S30: selecting one of the plurality of first images, which has a minimum brightness in the target reflected light region, as a minimum brightness image.

For example, with the enhancement of the filtering out effect of the reflected polarized light, the brightness of the target reflected light region is gradually decrease. Therefore, among the plurality of first images, the first image in which the target reflected light region has the minimum brightness is the image has a best filtering out effect of the reflected light.

S40: comparing the minimum brightness image with the second image to obtain a brightness ratio at a same pixel in a region other than the target reflected light region of the two images.

Theoretically, in the region other than the target reflected light region, the brightness ratio at each of the pixels should be the same. This brightness ratio represents that how much ambient light is filtered out by the polarizer. If there are a plurality of different brightness ratios, the brightness ratio with a highest occurrence is selected.

The brightness ratio at the same pixel is, for example, a ratio of brightness of a 50th pixel of the minimum brightness image to brightness of a 50th pixel of the second image.

S50: increasing brightness of each pixel of the minimum brightness image according to the brightness ratio to obtain an image in which light reflection is eliminated.

Here, the step increases the brightness of each pixel of the minimum brightness image by multiplying the brightness of each pixel of the minimum brightness by the brightness ratio, and the brightness is increased as much as that filtered out by the polarizer. If the brightness ratio is 2, the brightness of each pixel of the minimum brightness image is multiplied by 2, and the image formed by the pixels after the brightness enhancement is implemented is the image in which light reflection is eliminated.

For example, the above steps are completed by the processor, such as the main control circuit, in the electronic apparatus.

In the method of acquiring the image of the electronic apparatus provided by at least one embodiment of the disclosure, by acquiring the plurality of first images with different polarization angles and acquiring the second image without polarization processing in one photographing process, and by acquiring the target reflected light region by utilizing a comparison result of the plurality of first images and the second image, an accuracy of judging the target reflected light region and enhancing the brightness is increased, and the filtering out effect of the reflected light is increased.

The method of acquiring the image of the electronic apparatus provided by at least one embodiment of the present disclosure is described below with specific examples.

No voltage is applied to the liquid crystal light valve 40, at this moment, the polarization direction is 0°, and the first camera lens 10 acquires the first one of the first images; a voltage is applied to the liquid crystal light valve 40 to rotate the polarization direction of the liquid crystal layer by 45°, at this moment, the polarization direction of the liquid crystal layer is 45°, and the first camera lens 10 acquires the second one of the first images; and a voltage is applied to the liquid crystal light valve 40 to further rotate the polarization direction of the liquid crystal layer by 45°, at this moment, the polarization direction of the liquid crystal layer is 90°, and the first camera lens 10 acquires the third one of the first images; a voltage is applied to the liquid crystal light valve 40 to further rotate the polarization direction of the liquid crystal layer by 45°, at this time, the polarization direction of the liquid crystal layer is 135°, and the first camera lens 10 acquires the fourth one of the first images. During the period that the first camera lens 10 acquires the four of the first images as described above, the second camera lens 20 acquires the second image.

The processor compares brightness amplitudes of the four of the first images acquired by the first camera lens 10 at each of the pixels. Theoretical analysis shows that the larger the brightness difference at the pixel is, the greater the degree of the polarization is; and the first estimated reflected light region is determined by comparing the brightness difference at the same pixel with the set value.

The average brightness of all pixels in the second image is acquired, and a region composed of the pixels with brightness larger than the average brightness is taken as the second estimated reflected light region.

The region composed of the pixels in both the first estimated reflected light region and the second estimated reflected light region is taken as the target reflected light region.

The four first images are arranged according to an order of the brightness of the target reflected light region from strong to weak (for example, the order is that the second one of the first images, the third one of the first images, the fourth one of the first images and the first one of the first images), and the first image (for example, the first one of the first images) in which the target reflected light region has the smallest brightness and positions of the pixels of the determined target reflected light region are output.

For the first one of the first images and the second image, the brightness ratio at each of the pixels is obtained in the region other than the determined target reflected light region, and the brightness of all pixels of the minimum brightness image (for example, the first one of the first images) are increased by multiplying by the brightness ratio to generate the image in which light reflection is eliminated.

For example, the embodiments of the present disclosure obtain at least the following beneficial effects.

(1) By adding the liquid crystal light valve and the polarizer in front of the first sensor and by appropriately controlling of the rotation angle of the liquid crystal molecules, the polarizer filters out the reflected polarized light, so that there is no reflected light in the polarized light incident to the first sensor, thereby effectively eliminating the influence caused by the reflected light reflected on the surface of the object on the photographing effect.

(2) The optical rotation effect of the liquid crystal molecules is utilized, and the angle between the polarization direction of the reflected light and the polarization direction of the polarizer is automatically controlled by changing the electric field applied to liquid crystal molecules, thus eliminating the troublesome of adopting mechanical structures and manual identification.

(3) The polarizer and the liquid crystal light valve are added in the dual camera assembly, but other structures of the dual camera assembly are not changed, and thus the other functions of the dual camera (such as black-white dual photography and zoom dual photography) are not be affected.

What have been described above are only specific implementations of the present disclosure, the protection scope of the present disclosure is not limited thereto. Changes or substitutions that can be easily thought of by anyone familiar with the technical field within the technical scope disclosed in this disclosure should be covered within the protection scope of this disclosure. Therefore, the protection scope of the present disclosure should be based on the protection scope of the claims.

What is claimed is:

1. A method of acquiring an image adopting a dual camera assembly, the dual camera assembly comprising:
    a first camera lens and a second camera lens;
    a first sensor configured for receiving light that has passed through the first camera lens; and
    a liquid crystal light valve and a polarizer which are on a side, which is close to the first camera lens, of the first sensor,
    wherein the polarizer is on a side, which is close to the first sensor, of the liquid crystal light valve, and liquid crystal molecules in the liquid crystal light valve are rotatable, and
    wherein the method comprises:
    allowing the first camera lens to continuously acquire a plurality of first images, and allowing the second camera lens to acquire a second image during a period in which the first camera lens continuously acquires the plurality of first images, wherein the liquid crystal molecules in the liquid crystal light valve rotate by a set angle after the first camera lens acquires one of the plurality of first images;
    acquiring a target reflected light region according to the plurality of the first images and/or the second image;
    selecting one of the plurality of first images, which has a minimum brightness in the target reflected light region, as a minimum brightness image;

comparing the minimum brightness image with the second image to obtain a brightness ratio at a same pixel in a region other than the target reflected light region; and increasing brightness of each pixel of the minimum brightness image according to the brightness ratio to generate the image in which light reflection is eliminated.

2. The method of acquiring the image according to claim 1, wherein the acquiring the target reflected light region according to the plurality of the first images comprises:

comparing brightnesses of the plurality of first images, taking a region composed of pixels, at each of which a brightness difference is larger than a set value, as a first estimated reflected light region, and taking the first estimated reflected light region as the target reflected light region.

3. The method of acquiring the image according to claim 1, wherein the acquiring the target reflected light region according to the second image comprises:

acquiring an average brightness of all pixels in the second image, taking a region composed of pixels, each of which has a brightness larger than the average brightness, as a second estimated reflected light region, and taking the second estimated reflected light region as the target reflected light region.

4. The method of acquiring the image according to claim 1, wherein the acquiring the target reflected light region according to the plurality of the first images and the second image comprises:

comparing brightnesses of the plurality of first images, and taking a region composed of pixels, at each of which a brightness difference is larger than a set value, as a first estimated reflected light region;

acquiring an average brightness of all pixels in the second image, and taking a region composed of pixels, each of which has a brightness larger than the average brightness, as a second estimated reflected light region; and taking a region composed of pixels, each of which is in both the first estimated reflected light region and the second estimated reflected light region, as the target reflected light region.

5. The method of acquiring the image according to claim 1, wherein the first camera lens continuously acquires N first images, and the liquid crystal molecules in the liquid crystal light valve rotate by $(180/N)°$ after the first camera lens acquires one of the first images.

6. The method of acquiring the image according to claim 5, wherein the first camera lens continuously acquires four first images, and the liquid crystal molecules in the liquid crystal light valve rotate by 45° after the first camera lens acquires one of the first images.

* * * * *